March 26, 1968
U. RANZI
3,374,871
METHOD TO START HIGH-POWERED MACHINES BY MEANS OF CENTRIFUGAL
POWDER OR GRANULAR TYPE JOINTS
Filed June 29, 1965
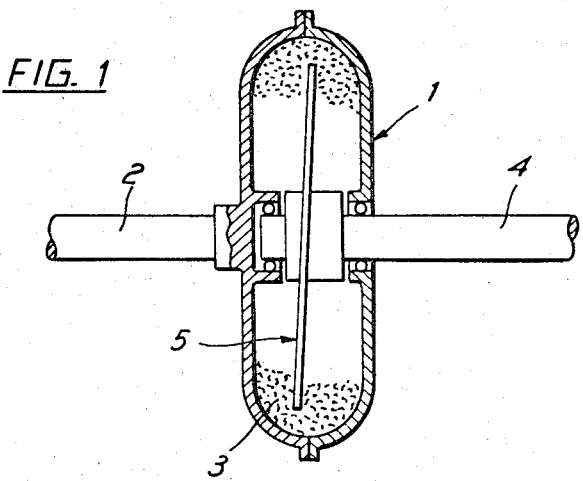
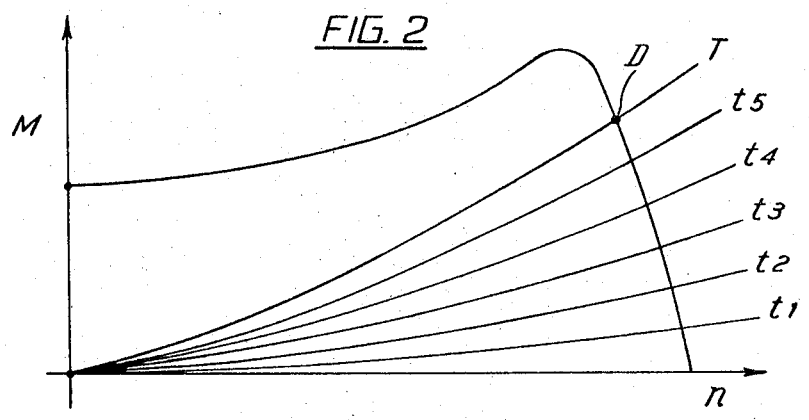
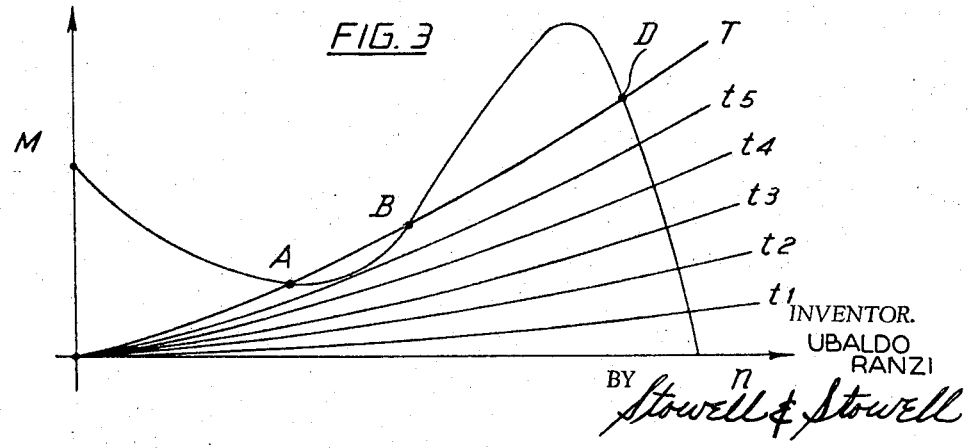
INVENTOR.
UBALDO RANZI
BY Stowell & Stowell
ATTORNEYS

United States Patent Office 3,374,871
Patented Mar. 26, 1968

3,374,871
METHOD TO START HIGH-POWERED MACHINES BY MEANS OF CENTRIFUGAL POWDER OR GRANULAR TYPE JOINTS
Ubaldo Ranzi, Via Roma 2, Legnano, Italy
Filed June 29, 1965, Ser. No. 467,850
4 Claims. (Cl. 192—58)

The present invention relates to a torque transmitting coupling in general and to those using powdered or granular materials.

The principal generic characteristic of any torque coupling is to remove in the starting stage the mechanical coupling between the driving machine (particularly in an asynchronous motor), and the driven one.

Other characteristics of torque transmitting couplings are as follows:

(a) The possibility from a mechanical point of view of starting a machine having a resisting torque, greater than that of the driving electric motor.

(b) Reduction to a minimum time the high current requirement in electric motors when they are started or running slowly. This result has a practical importance and is particularly noticeable when the driven means is heavy.

(c) The gradual starting of machines in which uneven accelerations could cause inconveniences of various types.

(d) It acts as a safety member when the resisting torque goes above a permissible predetermined maximum value. In this case, the coupling between the motor and the driven machine safeguards both of the machines from possible damage.

The centrifugal type torque transmitting coupling that is described hereinafter consists of a casing integral with the driving shaft containing discs keyed on the driven shaft, and a granular or powdered substance preferably of spherical shape, which substance serves as a means for transmitting the torque from the casing to the discs 5 coupled directly or indirectly to the driven means.

In this type of coupling, the powdered or granular substance, which behaves like a fluid from a certain point of view, acts through friction forces created by centrifugal or inertia actions, on the disc rigidly connected to the driven shaft and in certain cases said couplings also have some drawbacks.

Therefore, for instance, the characteristic (a) described aboved although being very useful in itself, can negatively effect the characteristic (c) above because, after some fractions of a second from the instant of closing the electric motor circuit, the coupling which is opportunely dimensioned transmits a sizeable torque to the driven means with attendant accelerations which can cause breakage or other damage.

This invention eliminates the above difficulties and allows the motor torque to develop gradually. According to the invention, these difficulties can be eliminated by a coupling comprising a casing for a disc and granular material, interposed between said disc and the casing, which casing is highly polished on at least one part of its inner surface containing the granular material. In this case, the amount of torque transmitted is not, as usually occurs, a single function of the number of turns of the driving shaft connected to the casing, but also a function of the time required. Therefore, said granular material becomes operative and transmits the torque to the driven shaft after a certain period of time, with consequent gradual starting of the driven machine, thus eliminating and modifying the behaviour of such motors as the short circuit asynchronous motors, the torque-turns curve of which has a well known uneven starting characteristic.

The invention will now be described by reference to the following description and the accompanying drawing.

FIGURE 1, shows diagrammatically in cross section, a granular material-type coupling which carries out the method of this invention.

FIGURE 2 is a diagram which shows the characteristic curve plotting the relationship between the torque M and the turns $n$ of a conventional asynchronous motor having the armature in short circuit, as well as the transitory curves $t_1$, $t_2$, $t_3$, $t_4$ of the coupling which are derived from the definitive characteristic T.

FIGURE 3 is similar to FIGURE 2 and shows the behaviour of an asynchronous motor the characteristic curve of which, relative to torque M-turns $n$ relationship, has a well known unevenness.

In connection with FIGURE 1, the coupling comprises a casing 1, to which the driving motor shaft 2 of an electric motor, not shown is connected. The granular or powdered material 3 is placed in casing 1; and the inner wall of the casing, towards the periphery, is smoothed and polished so that the granular material 3 can roll on said surface with limited friction or with a controlled and pre-established friction.

A disc 5, disposed within the casing and in the granular material 3, is inclined relative to the axis of shaft 4, which is the driven shaft to which the disc 5 is keyed.

Usually the characteristic of the coupling is a single one and in FIGURE 2 it is indicated by T; this means, in other words, that at the start the torque of the coupling transmitted from the driving shaft 2 to the driven shaft 4 is a single function of the rotational speed of casing 1 at said instant.

Under these conditions, the method of starting a motor coupled through the coupling of this invention to any machine is substantially instantaneous because the motor, due to the intermediary of the coupling, is not affected by the machine however heavy it may be, and the motor reaches instantaneously the rotational speed which correspond to the point of intersection D (FIGURE 2) of the characteristic T of the coupling with that of the motor, to thereby transmit at the same time the entire torque which corresponds to point D (FIGURE 2). This torque, in certain cases, can cause excessive accelerations of the motor as already stated.

The present invention uses the phenomenon that, in the various instants $t_1$, $t_2$, $t_3$, $t_4$, or $t_5$ of the starting stage, the coupling, with the disc 5 rotating through the same number of turns as the driven shaft 4, transmits different torques which gradually approach the corresponding value obtained from curve T.

There results from this a much more gradual and smooth starting which is attributed often and erroneously to all the centrifugal couplings.

The progressive build up of torque obtainable with the couping according to the invention provides the solution of an important problem which occurs when very high-powered asynchronous motors are used, the torque-turns characteristic of which has an uneven fluctuation shown in the curve of FIGURE 3. In this case, if the coupling should have a single characteristic T, independent of the time and depending on the turns, the motor would be balanced by the coupling at a number of turns corresponding to point A instead of point T. In other words the coupling would stop the motor from reaching its own number of rating turns, and it would be decidedly detrimental instead of useful. It should be noted that another point of balance could be also point B but the balance would be unsteady and would not impede it from reaching the balance of the coupling at the regular number of turns corresponding to point D. However, since the number of turns corresponding to point A, which is lower than that corresponding to point B, the observation now made basically lacks practical importance.

The coupling which performs the method now considered, besides providing the internal surface of casing 1 practically smooth as glass, has disc 5 which transmits the torque inclined at a predetermined angle relative to shaft 4.

What I claim is:

1. A torque transmitting coupling comprising relatively rotatable driving and driven elements, said driving element being a hollow casing with a drive shaft connected thereto, said driven element comprising a driven shaft having a disc rotatable therewith and disposed in said casing, said disc having a diameter less than the diameter of said casing, said casing having a mass of discrete granular material therein which serves as the torque transmitting medium between said elements, and the casing having an interior smooth and highly polished surface.

2. The coupling of claim 1 wherein said granular material is of spherical shape and said disc is inclined at an angle with respect to the axis of said driving shaft.

3. The coupling of claim 1 wherein said smooth and highly polished surface is annular in configuration.

4. The method of increasing the torque transmitting efficiency of a centrifugal powder torque coupling wherein granular material is used to transmit the torque between the coupling driving and driven elements comprising the step of highly polishing the interior surface of the coupling casing to reduce friction between said material and surface.

References Cited

UNITED STATES PATENTS

| 2,857,029 | 10/1958 | Ranzi. | |
| 2,925,896 | 2/1960 | Jaeschke | 192—21.5 |
| 2,983,349 | 5/1961 | Meiklejohn | 192—21.5 |

DONLEY J. STOCKING, *Primary Examiner.*

DAVID J. WILLIAMOWSKY, ARTHUR T. McKEON,
*Examiners.*